United States Patent
Ibe et al.

(10) Patent No.: US 6,508,143 B2
(45) Date of Patent: Jan. 21, 2003

(54) STRUCTURE FOR MOUNTING TO STEERING WHEEL

(75) Inventors: Shoichi Ibe, Iwakura (JP); Keisuke Imai, Kani (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 51 days.

(21) Appl. No.: 09/725,167

(22) Filed: Nov. 29, 2000

(65) Prior Publication Data

US 2001/0002965 A1 Jun. 7, 2001

(30) Foreign Application Priority Data

Dec. 7, 1999 (JP) ............................................. 11-348124
Nov. 22, 2000 (JP) ......................................... 2000-356510

(51) Int. Cl.$^7$ ................................................. G05G 1/10
(52) U.S. Cl. .......................... 74/552; 403/348; 403/350
(58) Field of Search ........................... 74/552; 280/731, 280/728.1, 728.3, 771, 773; 403/348, 349, 350, 351

(56) References Cited

U.S. PATENT DOCUMENTS 5,409,256 A * 4/1995 Gordon et al. ........... 280/728.2

FOREIGN PATENT DOCUMENTS

| JP | 8-301044 A | * 11/1996 |
| JP | 10-035389 | 2/1998 |
| JP | 10-119683 A | * 5/1998 |
| JP | 2000-272458 A | * 10/2000 |

* cited by examiner

Primary Examiner—Pam Rodriguez
(74) Attorney, Agent, or Firm—Nixon Peabody LLP; Thomas W. Cole

(57) ABSTRACT

A plurality of leg portions for mounting and a pair of engagement portions are formed at a mark. While the leg portions for mounting and engagement portions are being inserted through, the mark is mounted in a recess portion of a pad cover. Thereafter, a spring formed in a substantially annular shape is mounted to the leg portions for mounting, and bent end portions of the spring are resiliently engaged with the engagement portions. Accordingly, as compared with prior structures utilizing heat-caulking and metal-caulking, the mark can be mounted to the pad cover simply and reliably, and costs and the space which is used can be reduced.

22 Claims, 9 Drawing Sheets

STRUCTURE FOR MOUNTING TO STEERING WHEEL

BACKGROUND OF THE INVENTION

1. Field of the Invention

The present invention relates to a structure for mounting to a steering wheel, specifically, for mounting a plate body to a pad cover which is used when mounting a plate body to a predetermined position of a surface side of a pad cover which is mounted on a steering wheel.

2. Description of the Related Art

Conventionally, a relatively large-sized, thin, plate-shaped mark is set at a substantially central portion of a pad cover of a steering wheel. Commonly used methods of fixing such a mark to a pad cover are a method of heat-caulking resin leg portions, which extend from the mark, to a reverse surface of the pad cover, and a method of caulking-fixing metal leg portions, which extend from the mark, by applying a load thereto.

However, in the case of fixing a mark by heat caulking, plural fixing points must be set from the standpoint of the mounting strength. Accordingly, a process for using equipment for heat fixing must be added, resulting in an increased number of assembly processes, and an increase in costs. Further, in the case in which the mark is fixed by metal caulking, in order to prevent the mark from being pulled out, a metal plate or the like must be provided at the reverse surface side of the pad cover. Accordingly, there are problems in that the number of parts increases, the cost increases, and a space for setting the metal plate or the like must be provided at the reverse surface side of the pad cover.

SUMMARY OF THE INVENTION

In view of the aforementioned, an object of the present invention is to provide a structure for mounting a plate body to a pad cover in which a plate body can be mounted to a pad cover by a simple method, and costs and the space which is used can be reduced.

A first aspect of the present invention is a structure for mounting to a steering wheel, the structure comprising: (a) a pad cover mountable to a steering wheel, the pad cover having a through hole defined therethrough; (b) a plate body having a leg inserted into the through hole; and (c) a resiliently deformable body which is engaged with a distal end of the leg.

A second aspect of the present invention is a structure for mounting to a steering wheel, the structure comprising: (a) a pad cover mountable to a steering wheel and having opposite sides and holes extending through one side to the other; (b) a plate body having a plurality of legs inserted through the holes and each leg having a distal end bent portion; and (c) an annular resiliently deformable body disposed at one side of the pad cover and engaging with the distal end bent portions of the plurality of legs inserted through the holes.

A third aspect of the present invention is a structure for mounting to a steering wheel, the structure comprising: (a) a pad cover mountable to a steering wheel, the pad cover having through holes formed therethrough; (b) a plate body having a plurality of legs inserted into the through holes, and having a plurality of projections, each leg having a distal end bent portion; (c) an annular resiliently deformable body retaining the legs in the through holes, the resiliently deformable body engaging with distal end bent portions of the plurality of legs, the resiliently deformable body including end portions, which engage with the projections; and (d) a stopper which substantially prevents longitudinal movement of the resiliently deformable body.

In accordance with the present invention, first, the plate body is mounted to the reverse surface side of the pad cover. Namely, the leg portions for mounting, which project from the reverse surface of the plate main body portion, are inserted into the mounting holes formed in the pad cover. Next, at the reverse surface side of the pad cover, the resiliently deformable body, which is formed in a substantially annular shape, is mounted to the plural leg portions for mounting which are inserted through the mounting holes. In a state in which the resiliently deformable body is engaged with the passed-through end portions of the plural leg portions for mounting, substantially the entirety of the peripheral portion of the resiliently deformable body interferes with (engages with) the reverse surface of the pad cover. In this way, the plate body does not come out in the direction of separating from the front surface side of the pad cover. Namely, in accordance with the present invention, merely due to the resiliently deformable body formed in a substantially annular shape engaging with the plurality of leg portions for mounting, mounting of the plate body to the pad cover is made possible.

Further, because the leg portions for mounting of the plate body are not subjected to heat caulking or metal caulking, the number of assembly processes is few. In addition, because the resiliently deformable body is formed in a substantially annular shape, there is no need to provide a particular space therefor. Accordingly, the cost and the space which is used can be reduced.

In accordance with the present invention, when the plate body is mounted to the front surface side of the pad cover, not only are the plurality of leg portions for mounting inserted through the mounting holes of the pad cover, but also, the engagement portions are inserted into the through holes of the pad cover. In this state, at the reverse surface side of the pad cover, the peripheral portion of the resiliently deformable body is engaged with the passed-through end portions of the leg portions for mounting, and the end portions of the resiliently deformable body facing each other across the opening of the resiliently deformable body are engaged with the engagement portions. In this way, there is no relative movement of the resiliently deformable body in either the radial direction or the peripheral direction. As a result, the resiliently deformable body can be reliably prevented from coming out of the leg portions for mounting at the plate body.

Taper guide surfaces, whose heights gradually decrease along the radial direction, are formed at extended end portions of the engagement portions. Thus, when the end portions of the resiliently deformable body which face each other across the opening are engaged with the engagement portions, these end portions slide along the taper guide surfaces of the engagement portions and drop into the engagement portions. These end portions of the resiliently deformable body can thereby be easily and reliably engaged with the engagement portions.

Further, in accordance with the present invention, when the plate body is mounted to the front surface side of the pad cover, the plurality of leg portions for mounting are inserted into the mounting holes of the pad cover. In the present invention, the leg portions for mounting are extended toward the radial direction outer side. Thus, the resiliently deformable body is mounted between the pad cover and the leg portions for mounting which have been inserted through the mounting holes.

In the present invention, the gap between the pad cover and the extended end portion of at least one of the leg portions for mounting is set so as to be smaller than the wire diameter of the resiliently deformable body. Thus, at this portion, the resiliently deformable body is mounted by being pushed into the gap. Accordingly, after the resiliently deformable body has been mounted, because the gap is smaller than the wire diameter of the resiliently deformable body, the resiliently deformable body does not inadvertently move outwardly in the radial direction, and does not come out from the leg portions for mounting.

Further in accordance with the present invention, a limiting device, which is inserted between the end portions of the resiliently deformable body opposing each other across the opening of the resiliently deformable body at the reverse surface side of the pad cover and which limits the peripheral direction movement of the resiliently deformable body with respect to the pad cover, is provided. Thus, rotation of the resiliently deformable body can be prevented.

DESCRIPTION OF THE PREFERRED EMBODIMENTS

First Embodiment

A first embodiment of the present invention will be described hereinafter with reference to FIGS. 1 through 5.

Figure 5:
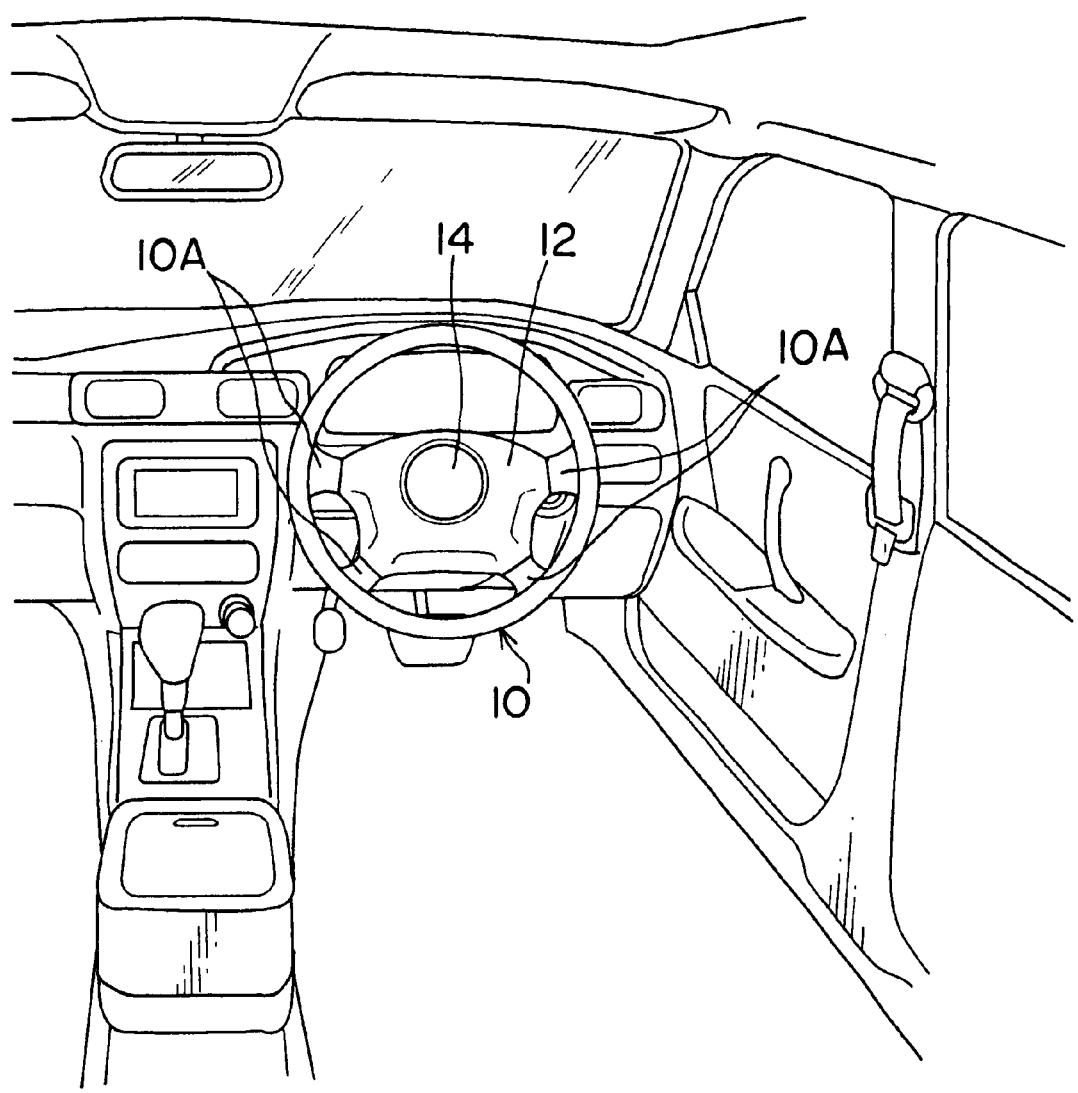
FIG. 5 is a front view, as seen from a vehicle occupant side, of an external appearance of a steering wheel relating to the first embodiment.

FIG. 5 illustrates the exterior of a steering wheel 10 relating to the present first embodiment, as viewed from a vehicle occupant side. As illustrated in FIG. 5, the steering wheel 10 relating to the present first embodiment is a four-spoke-type steering wheel, and a pad cover 12 is disposed substantially at the central portion thereof. The pad cover 12 is formed in a substantially rectangular shape as seen from the front surface thereof. The four corners thereof are smoothly connected to spoke portions 10A of the steering wheel 10. An air bag device (not shown), which is positioned as a device for assisting in the protection of a vehicle occupant, is provided at the reverse surface side (the side opposite the vehicle occupant side) of the pad cover 12.

A mark 14, which serves as a "plate body" and which is circular as seen from the front surface thereof, is mounted to the central portion of the front surface side (the design surface side) of the pad cover 12 structured as described above. The feature of the present first embodiment resides in the structure for mounting the mark 14 to the pad cover 12, and will be described in detail hereinafter.

Figure 1:
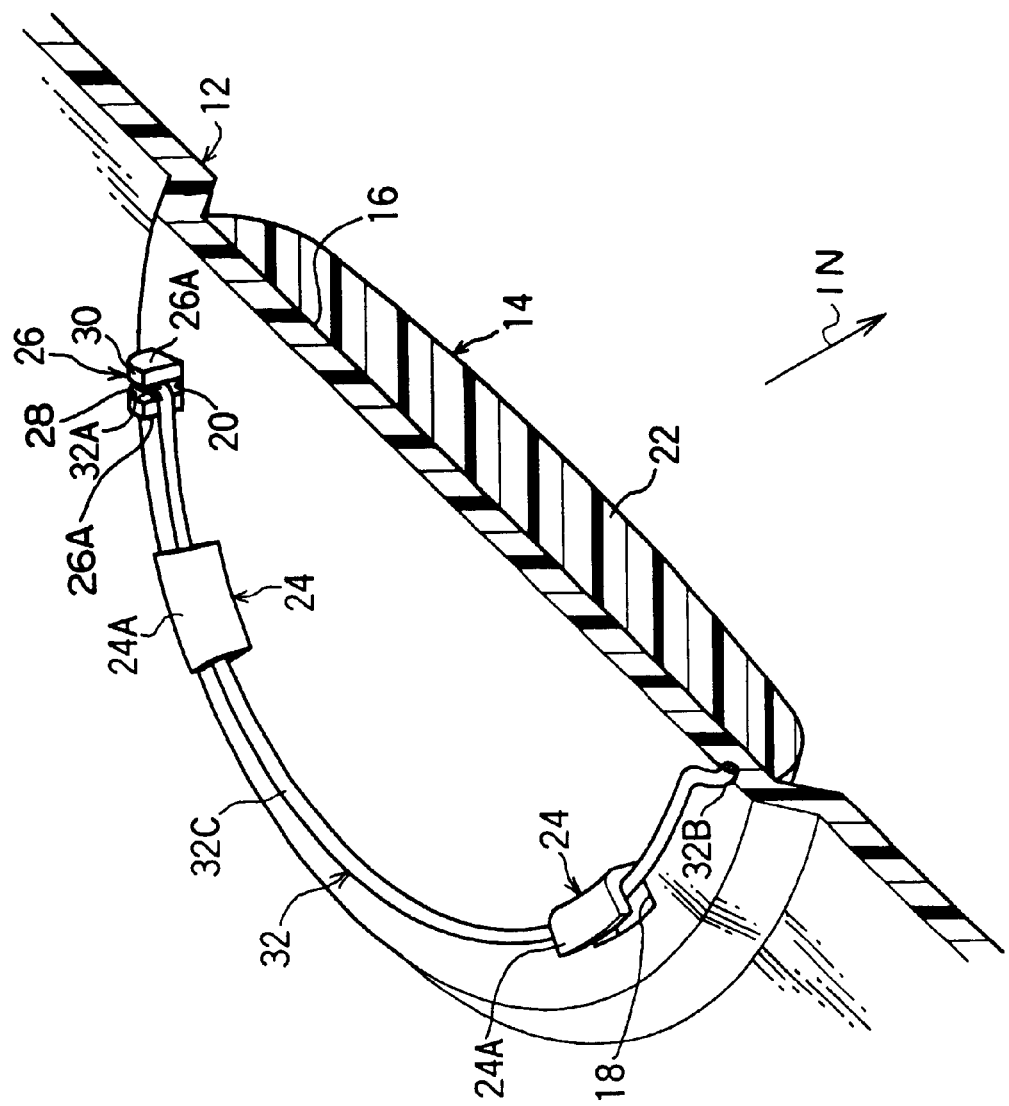
FIG. 1 is a perspective view illustrating a state in which a mark relating to the first embodiment of the present invention is mounted to a pad cover, wherein the pad cover is inverted and cut in a longitudinal direction of a vehicle.
Figure 2:
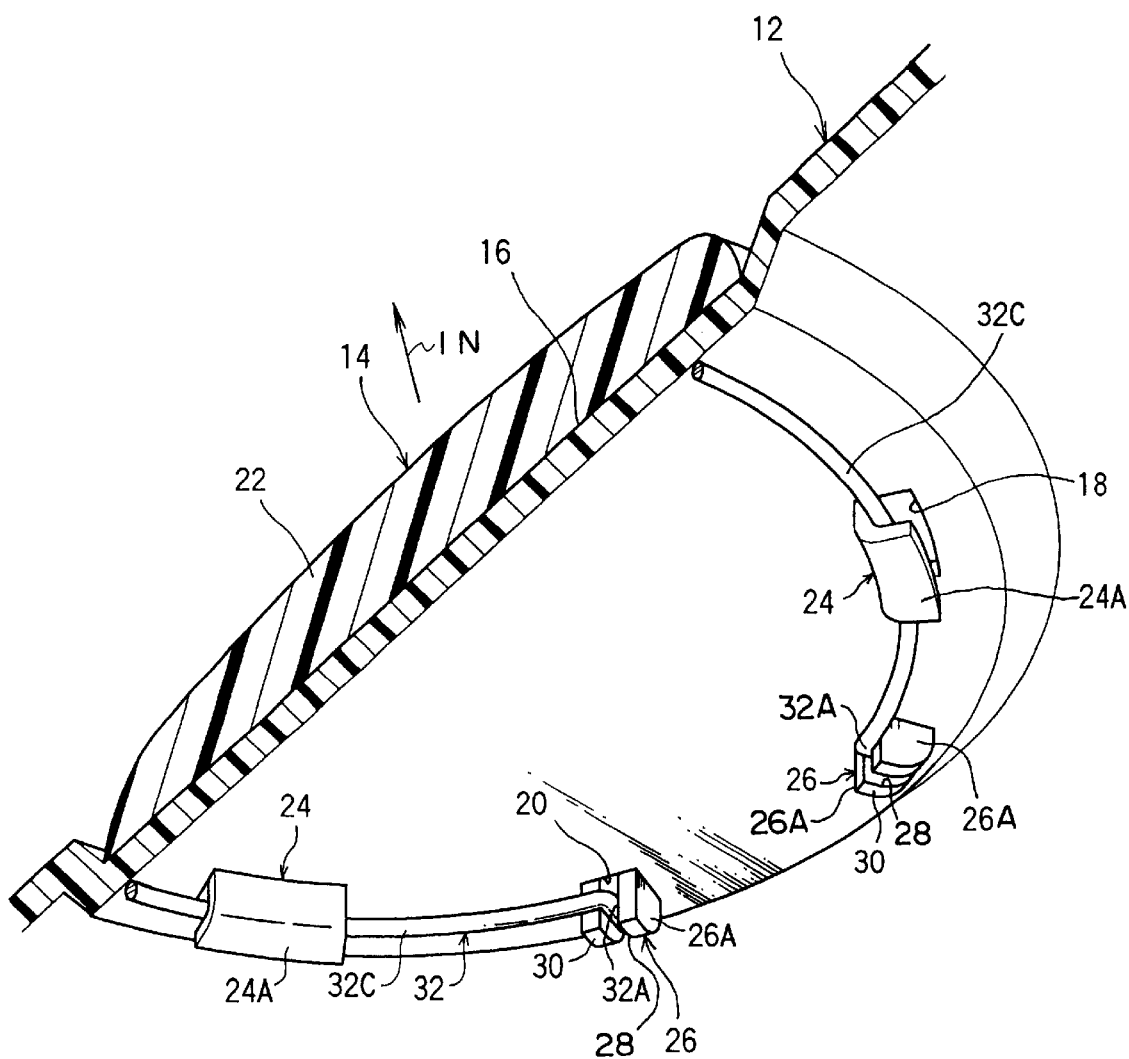
FIG. 2 is a perspective view illustrating a state in which the mark relating to the first embodiment of the present invention is mounted to a pad cover, wherein the pad cover is cut along a transverse direction of the vehicle, as seen from a reverse side in a normally mounted state without inverting the pad cover.
Figure 3:
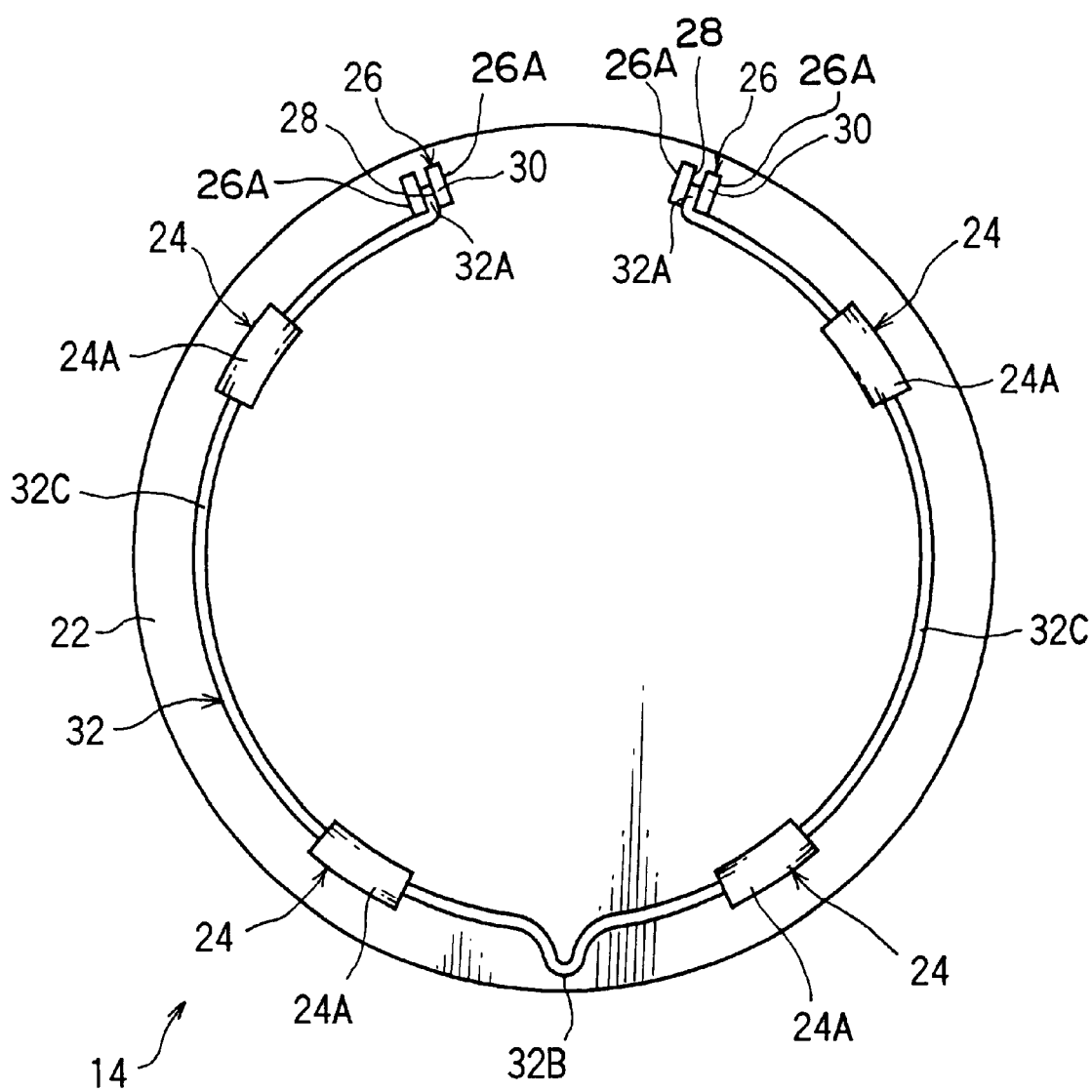
FIG. 3 is a reverse surface view of a state in which a spring is attached to a mark, as seen from a reverse surface side.
Figure 4:
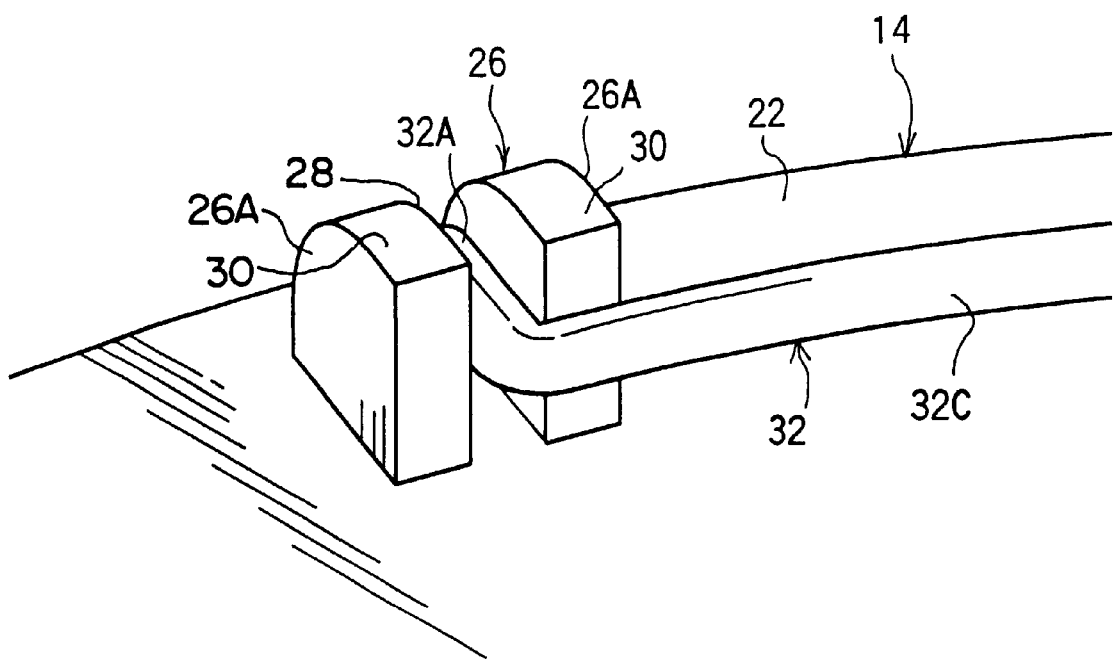
FIG. 4 is an enlarged perspective view of main portions, illustrating, in an enlarged manner, an engagement portion shown in FIG. 3.

FIGS. 1 and 2 are perspective views illustrating a state in which the mark 14 is attached to the pad cover 12. FIG. 1 shows a state in which the pad cover 12 is inverted and is cut along the longitudinal direction of the vehicle, whereas FIG. 2 shows a state in which the pad cover 12 is cut along the transverse direction of the vehicle, as seen from a reverse side in an ordinarily assembled state without inverting the pad cover. Moreover, FIG. 3 is a reverse surface view illustrating a state in which a spring 32 is engaged with the mark 14. The arrow marked "IN" in the drawings indicates the direction of the vehicle compartment inner side.

As shown in these figures (and in FIGS. 1 and 2 in particular), the pad cover 12 is formed of resin, and a recess portion 16 for placement of the mark 14 is formed at a predetermined position of the front surface side thereof. A plurality of mounting holes 18 and a pair of insertion holes 20 are formed at the outer peripheral side of the bottom portion of the recess portion 16. The surface area of the opening of the mounting hole 18 is set to an extent that enables insertion of a leg portion 24 for mounting which will be described later. The surface area of the opening of the insertion hole 20 is set to an extent that enables insertion of an engagement portion 26 which will be described later.

The mark 14 is made of resin. As illustrated in FIGS. 1 through 4, the mark 14 is formed by a mark main body portion 22, the plurality of leg portions 24 for mounting, and the pair of engagement portions 26. The mark main body portion 22 is substantially shaped as a circular plate, and serves as the "plate main body portion". The leg portions 24 for mounting extend in the plate thickness direction from the reverse surface side of the mark main body portion 22. The engagement portions 26 similarly extend in the plate thickness direction from the reverse surface side of the mark main body portion 22.

The leg portions 24 for mounting are each set to have a predetermined width and a predetermined extended length, and are resiliently deformable in the radial direction of the mark 14. A hook-shaped anchor portion 24A, whose anchoring end is directed toward the radial direction outer side, is formed integrally with the distal end portion of the leg portion 24 for mounting. The engagement portion 26 is formed by a pair of wall portions 26A which are disposed parallel to one another. An engaging groove 28, which has a groove width which is substantially equal to the wire diameter of the spring 32 which will be described later, is formed between the pair of wall portions 26A. Circular-arc-shaped guide surfaces 30 (see FIG. 4) are formed at the distal end surfaces of the pair of wall portions 26A forming the engagement portion 26. The circular-arc-shaped guide surfaces 30 are shaped as substantially arc-shaped surfaces whose height gradually decreases from the radial direction inner side toward the radial direction outer side. Instead of the circular-arc-shaped guide surfaces 30, another guide surface, such as a tapered inclined surface formed from one or two or more flat surfaces, may be used.

As illustrated in FIG. 3 and other figures, the spring 32, which serves as a "resiliently deformable body" for fixing the mark 14 to the pad cover 12, is formed by bending a wire into a substantially annular shape. One portion of the spring 32 in the peripheral direction thereof is open, and the pair of end portions of the spring 32 which oppose one another across this opening are bent at substantial right angles toward the radial direction outer side. (Hereinafter, these portions are called "bent end portions 32A".) A convex portion 32B, which projects in a substantially mountain-shaped configuration at a position opposite, in the radial direction, to the pair of bent end portions 32A, is formed integrally with the spring 32. By forming the convex portion 32B, a pair of peripheral portions 32C, which are each substantially semicircular, are formed at the sides of the convex portion 32B. In an assembled state, the spring 32 having the above-described structure has a substantially circular shape as illustrated in FIG. 3. In a natural state, the pair peripheral portions 32C expand in directions of moving apart from each other (i.e., toward radial direction outer sides) from the convex portion 32B.

Next, the operation and effects of the present first embodiment will be described.

First, a summary of the processes for assembling the mark 14 relating to the present first embodiment to the pad cover 12 will be briefly described. First of all, the mark 14 is mounted into the recess portion 16 of the pad cover from the front surface (design surface) side of the pad cover 12. Specifically, the plurality of leg portions 24 for mounting, which extend from the reverse surface of the mark main body portion 22, are inserted into the plurality of mounting holes 18 formed in the pad cover 12. At this time, the pair of engagement portions 26, which extend from the reverse surface of the mark main body portion 22, are inserted into the pair of insertion holes 20 formed in the pad cover 12.

Next, at the reverse surface side of the pad cover 12, the spring 32, which is formed in a substantially annular configuration, is attached to the plurality of leg portions 24 for mounting which pass through the mounting holes 18. Specifically, when the spring 32 is in a natural state, the pair of peripheral portions 32C expand in directions of moving apart from each other (toward outer sides in the radial direction) from the convex portion 32B. Thus, when the spring 32 is assembled, the pair of bent end portions 32A are engaged with the engagement grooves 28 of the engagement portions 26 while the pair of peripheral portions 32C are resiliently deformed in directions of approaching each other (toward the inner side in the radial direction). At this time, the bent end portions 32A of the spring 32 abut the guide surfaces 30 formed at the peripheral wall portions 26A of the engagement portions 26, and the bent end portions 32A slide along the guide surfaces 30 from the radial direction outer side toward the radial direction inner side. In this way, the bent end portions 32A are easily and reliably engaged with the engagement grooves 28 of the engagement portions 26.

As described above, in the state in which the spring 32 is resiliently engaged with the plurality of leg portions 24 for mounting, the peripheral portions 32C of the spring 32 are in a resiliently deformed state and are anchored on the anchor portions 24A of the leg portions 24 for mounting. Substantially the entire periphery of the spring 32 interferes (engages) with the reverse surface of the pad cover 12. In this way, the mark 14 does not come out in a direction of moving apart from the front surface side of the pad cover 12.

As can be understood from the above description, in the present embodiment, the mark 14 can be easily mounted to the pad cover 12 merely by resiliently engaging the spring 32, which is formed in a substantially annular shape, with the plurality of leg portions 24 for mounting.

Further, in the present first embodiment, the plural leg portions 24 for mounting of the mark 14 are not heat-caulked or metal-caulked. Thus, the assembly processes are merely, as described above, the following two processes: the process for inserting the mark 14 into the pad cover 12, and the process for mounting the spring 32 to the leg portions 24 for mounting and the engagement portions 26 of the mark 14. Thus, the number of assembly process can be reduced. Further, if these processes are carried out manually, there is no need to use special equipment. Moreover, because the spring 32 is formed in a substantially annular shape, there is no need to provide a special space therefor at the reverse surface side of the pad cover 12. Thus, in accordance with the present first embodiment, the costs and the amount of space required can be reduced.

Moreover, in the present first embodiment, the engagement portions 26, which are provided with the engagement grooves 28, are formed at the reverse surface of the mark 14. After the mark 14 is mounted to the recess portion 16 of the pad cover 12, the pair of bent end portions 32A of the spring 32 are resiliently engaged with the engagement grooves 28 of the engagement portions 26. Thus, the relative movement toward the axial direction outer side and the relative movement in the peripheral direction, of the bent end portions 32A of the spring 32 can be limited. As a result, in accordance with the present first embodiment, the spring 32 can be reliably prevented from coming out from the leg portions 24 for mounting at the mark 14. As a result, the mounted state of the mark 14 to the pad cover 12 can be made stable.

In addition, in the present first embodiment, the guide surfaces 30, whose heights gradually decrease from the radial direction inner side toward the radial direction outer side, are formed at the peripheral wall portions 26A of the engagement portions 26. Thus, when the bent end portions 32A of the spring 32 are engaged resiliently with the engagement grooves 28 of the engagement portions 26, by sliding the bent end portions 32A along the guide surfaces 30 of the engagement portions 26 and dropping the bent end portions 32A into the engagement grooves 28, the bent end portions 32A can be simply and reliably engaged with the engagement grooves 28 of the engagement portions 26. As a result, in accordance with the present first embodiment, the workability of assembly of the spring 32 can be improved.

In the above-described first embodiment, both of the pair of end portions at the opening of the spring 32 are bent outwardly in the radial direction so as to form the two bent end portions 32A. However, the present invention is not limited to the same, and it suffices to bend at least one of the end portions at the opening outwardly in the radial direction. In a case in which only one bent end portion 32A is formed, only one engagement portion 26 is formed.

Figure 6:
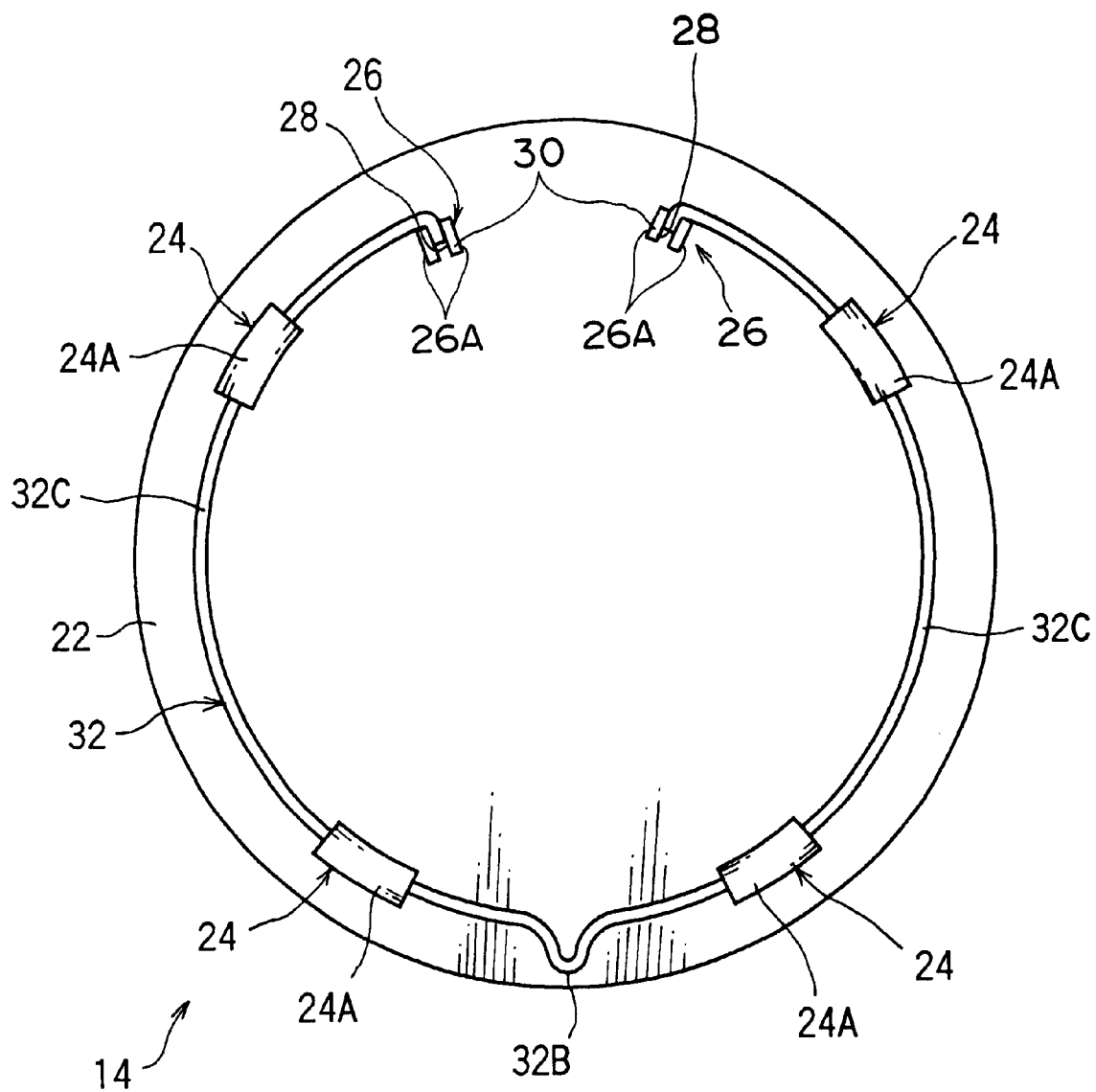
FIG. 6 is a reverse side view illustrating a mounted state in which the spring attempts to urge the mark toward the radial direction inner side.

Further, in the first embodiment, the pair of peripheral portions 32C of the spring 32 have urging force (resiliently deformable restoring force) toward the outer side in the radial direction. However, the present invention is not limited to the same, and the pair of peripheral portions of the spring may have urging force (resiliently deformable restoring force) toward the inner side in the radial direction. In this case, as illustrated in FIG. 6, by setting the position of the engagement portions 26 to be at the radial direction inner side of the spring and by bending the pair of bent end portions toward the radial direction inner side, rotation of the spring in the longitudinal direction can be prevented.

In the first embodiment, the convex portion 32B, which projects toward the outer side in the radial direction, is formed at the spring 32. However, the convex portion 32B may be omitted.

In the above-described first embodiment, the pair of engagement portions 26 are formed at the reverse surface of the mark 14. However, a structure in which the engagement portions 26 are omitted may be used. For example, if the spring 32 having urging force toward the outer side in the radial direction is used as it is, if the orientation of the engagement claws of the leg portions for mounting is set in the opposite direction, i.e., if the engagement claws are oriented toward the radial direction inner side of the spring, even if the spring 32 moves relatively in the peripheral direction, the bent end portions 32A interfere with the side surfaces of the leg portions for mounting. Thus, the effect of preventing the spring 32 from coming out from the leg portions for mounting is the same as that of the first embodiment.

In the first embodiment, the guide surfaces 30 are formed at the peripheral wall portions 26A of the engagement portions 26 from the standpoint of assembly workability. However, if it is not necessary to consider the assembly workability, the guide surfaces 30 may be omitted.

Second Embodiment

Figure 8:
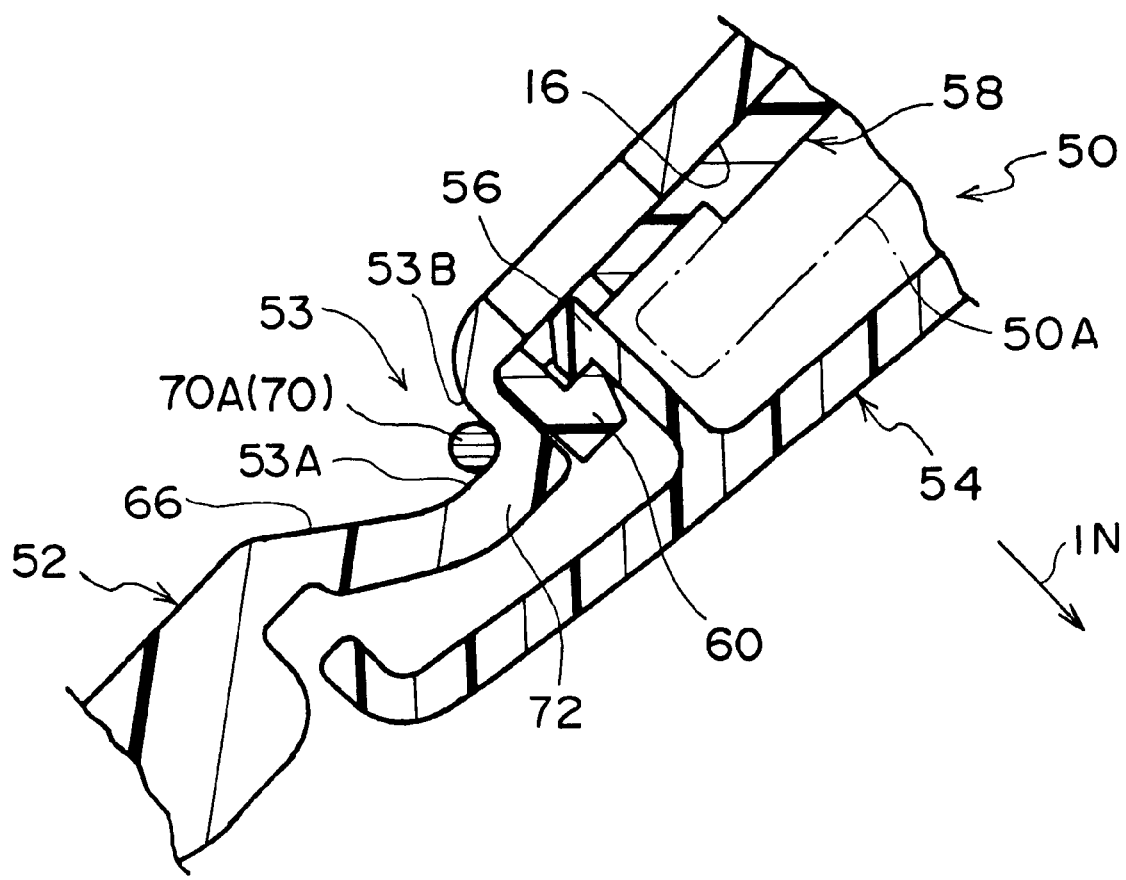
FIG. 8 is a cross-sectional view taken along line 7—7 of FIG. 7 and illustrating, in an enlarged manner, main portions of the second embodiment.
Figure 9:
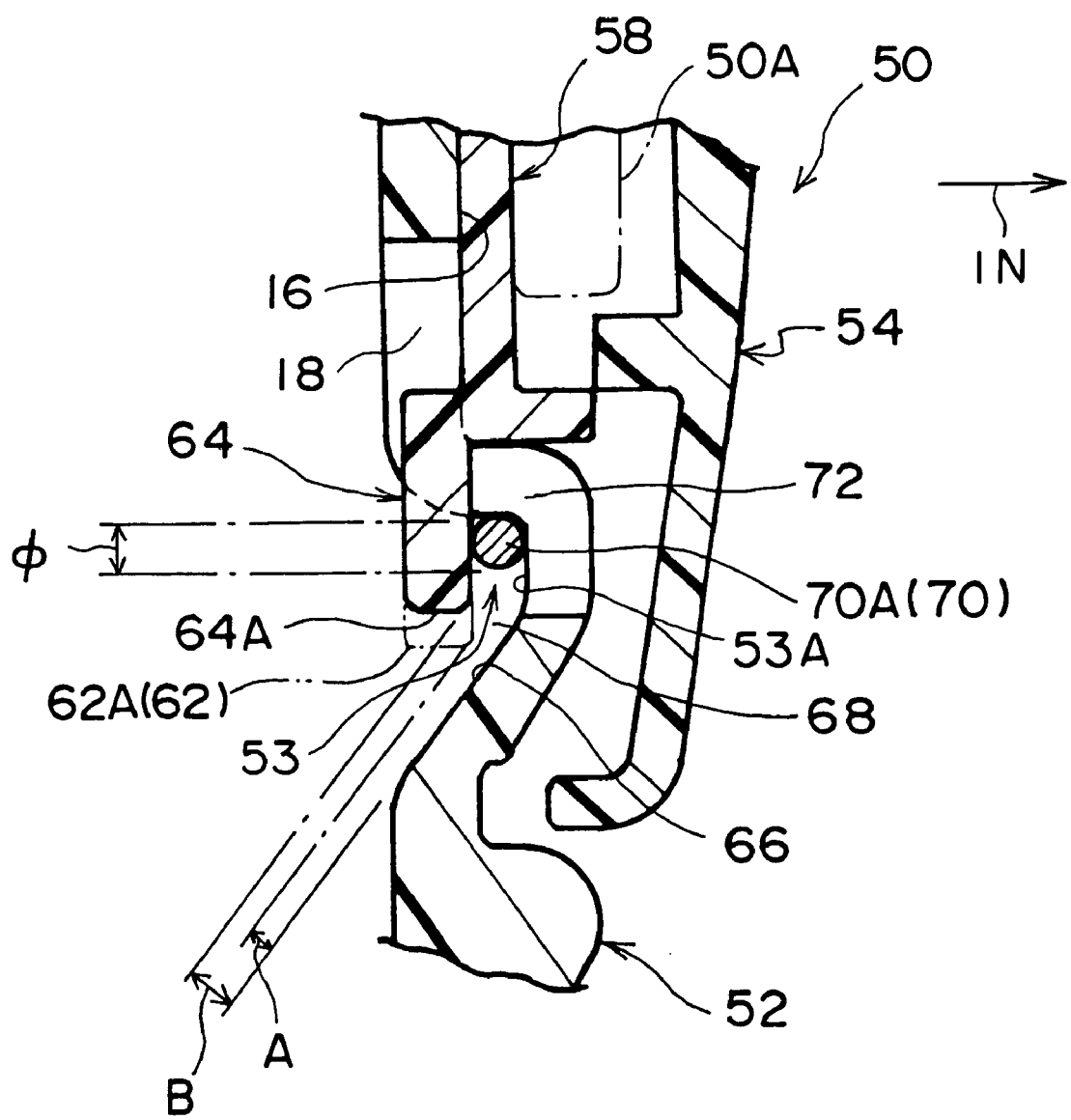
FIG. 9 is a cross-sectional view taken along line 8—8 of FIG. 7 and illustrating, in an enlarged manner, main portions of the second embodiment.

A second embodiment of the present invention will be described hereinafter with reference to FIGS. 7 through 9. Structural portions which are the same as those of the previously-described first embodiment are designated by the same reference numerals, and description thereof is omitted.

Figure 7:
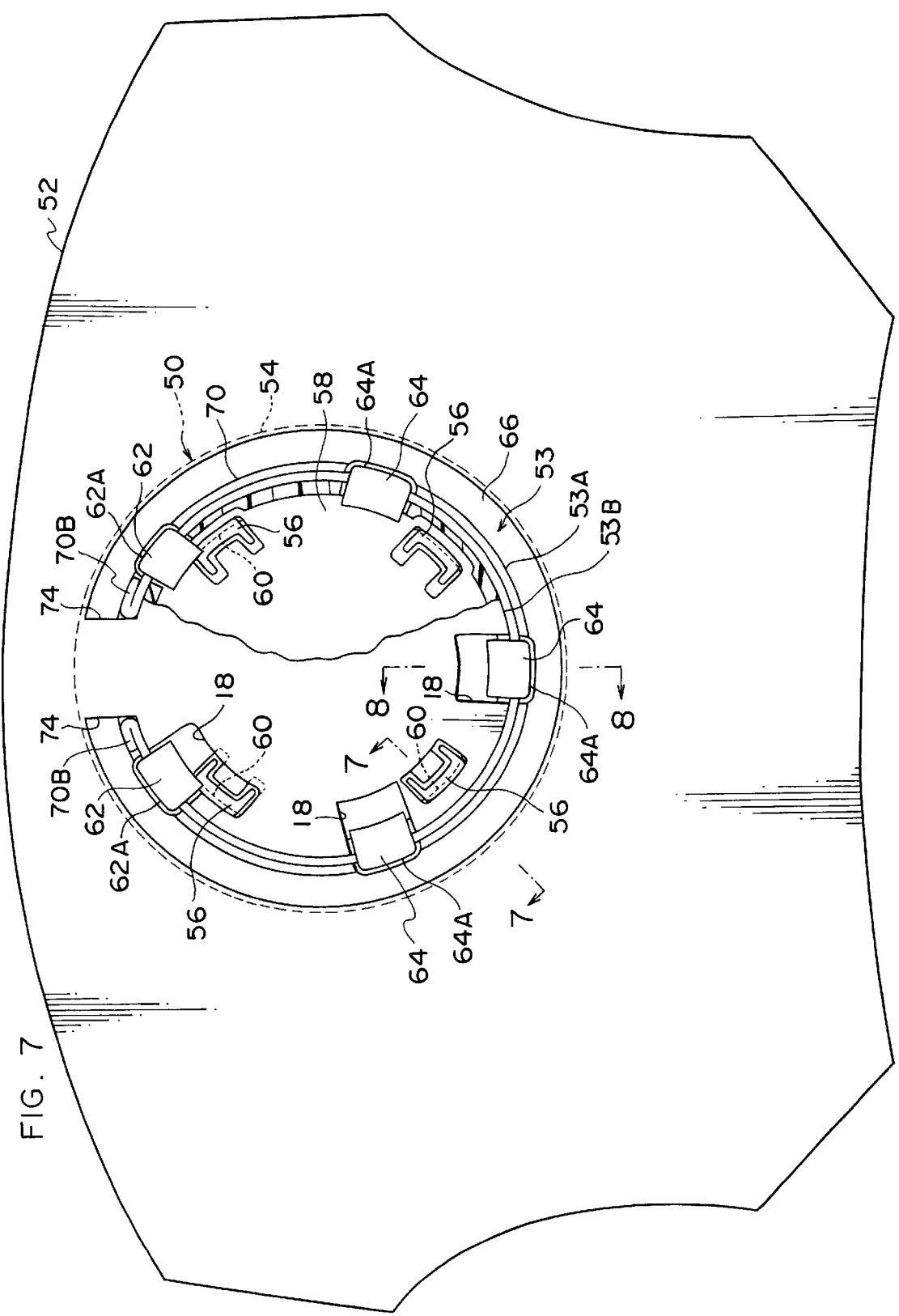
FIG. 7 is a partially cutaway reverse surface view, as seen from a reverse surface side, of a structure for mounting a mark relating to a second embodiment of the present invention, to a pad cover.

FIG. 7 is a partially cutaway view, as seen from a reverse surface side, of a state in which a mark 50, which serves as a "plate body" relating to the present second embodiment, is mounted to a pad cover 52. FIGS. 8 and 9 are cross-sectional views illustrating the state in which the mark 50 is mounted to the pad cover 52.

As can be seen from these figures, in the present second embodiment, the mark 50 is formed by two parts which are a mark front surface side member 54 and a mark reverse surface side member 58. A plurality of anchoring claws 56 (see FIG. 8), which extend in the plate thickness direction and are resiliently deformable in the radial direction, are formed at equal intervals at the reverse surface of the mark front surface side member 54 forming the design surface (the arrow IN direction side). (In the present embodiment, there are four anchoring claws 56.) In correspondence therewith, anchoring claws 60 (see FIG. 8), which extend in the plate thickness direction and are resiliently deformable in the radial direction, are formed at equal intervals at the front surface of the mark reverse surface side member 58 which is disposed so as to abut the recess portion 16 of the pad cover 52. Due to the anchoring claws 60 of the mark reverse surface side member 58 being anchored on the anchoring claws 56 of the mark front surface side member 54, the two parts are integrated so as to form the mark 50. A part 50A relating to a horn switch is disposed in the space between the mark front surface side member 54 and the mark reverse surface side member 58, and is operated by the mark front surface side member being pressed. Further, in the present second embodiment, the mark front surface side member 54 and the mark reverse surface side member 58 correspond to the "plate main body portion" of the first aspect.

Here, leg portions 62, 64 for mounting are formed at equal intervals integrally with the outer peripheral portion of the mark reverse surface side member 58. (In the present second embodiment, five leg portions 62, 64 for mounting are provided.) As illustrated in FIGS. 7 and 9, the leg portions 62, 64 for mounting extend from the peripheral portion of the mark reverse surface side member 58 toward the radial direction outer side, and are inserted into the mounting holes 18 formed in the pad cover 52, and project toward the reverse surface side at the opposite side from the front surface side (arrow IN direction side) of the pad cover 52. As illustrated in FIG. 7, an annular groove 53 is formed in the reverse surface of the pad cover 52. As illustrated in FIGS. 8 and 9, at the groove 53, the inner peripheral side of a bottom surface 53A forms a tubular surface 53B which is parallel to the steering shaft (substantially parallel to the direction of arrow IN), and the outer peripheral side forms an inclined surface 66 whose groove depth gradually becomes more shallow. Circumferential direction portions of the groove 53 end at walls 74, such that the groove forms a C-shape on the whole. In the state in which the leg portions 62, 64 for mounting are inserted into the mounting holes 18, distal end portions 62A, 64A of the leg portions 62, 64 for mounting are disposed in the vicinity of the inclined surface 66 of the groove 53 formed at the pad cover 52. Among the distal end portions 62A and the distal end portions 64A, the distal end portions 62A of the two leg portions 62 for mounting, which are disposed at the side at which is disposed a pair of bent end portions 70B of a spring 70, are disposed closer to the inclined surface 66 of the pad cover 52 than the distal end portions 64A of the other leg portions 64 for mounting are. Specifically, the following relationship is established: $A<\phi \leq B$, wherein A is the gap dimension of a space 68 between the inclined surface 66 and the distal end portion 62A of the leg portion 62 for mounting provided at the side at which are provided the bent end portions 70B of the spring 70; $\phi$ is the wire diameter of the spring 70; and B is the gap dimension of the space 68 between the inclined portion 66 and the distal end portion 64A of the leg portion 64 for mounting.

The mark 50 is fixed to the reverse surface side of the pad cover 52 by the spring 70 which serves as a "resiliently deformable body" and is formed by bending a wire into a substantially annular shape. The spring 70 of the present second embodiment is basically structured the same as the spring 32 of the previously-described first embodiment, and is provided with peripheral portions 70A and the pair of bent end portions 70B. However, the spring 70 differs from the spring 32 in that the convex portion 32B of the spring 32 in the first embodiment is not formed at the spring 70 of the present second embodiment, and that in the assembled state shown in FIG. 7, the spring 70 of the present second embodiment has urging force toward the radial direction inner side, and the pair of bent end portions 70B are bent back so as to form substantially U-shaped configurations (see FIG. 7).

The peripheral portions 70A of the spring 70 structured as described above are inserted from the space 68 between the distal end portions 62A, 64A of the leg portions 62, 64 for mounting of the mark reverse surface side member 58 and the inclined portion 66 of the pad cover 52. Due to the peripheral portions 70A abutting the tubular surface 53B and being disposed in the space between the bottom surface 53A of the groove 53 and the distal end portions 62, 64, the mark 50 is mounted into the recess portion 16 of the pad cover 52.

Further, the pair of bent end portions 70B of the spring 70 oppose the walls 74 at the both ends of the groove 53, such that the movement of the spring 70 in the direction along the longitudinal axis is limited.

Next, the operation and effects of the present embodiment will be described.

The mark 50 relating to the present second embodiment is mounted into the recess portion 16 of the pad cover 52 as described hereinafter. First, the mark 50, which is assembled such that the front surface side member 54 and the reverse surface side member 58 are pushed toward each other via the engagement claws 60, is mounted to the recess portion 16 of the pad cover 52 from the front surface (design surface) side of the pad cover 52. Specifically, the plurality of leg portions 62, 64 for mounting, which extend from the reverse surface of the mark reverse surface side member 58 toward the radial direction outer sides, are inserted through the plurality of mounting holes 18 formed in the pad cover 52.

Next, the spring 70, which is formed in a substantially annular shape, is correspondingly assembled to the distal end portions 62A, 64A of the leg portions 62, 64 for mounting which pass through the mounting holes 18. Specifically, the spring 70 in its natural state expands outwardly in the radial direction, and the peripheral portions 70A of the spring 70 are inserted into the space 68 between the inclined portion 66 and the distal end portions 64A of the leg portions 64 for mounting. Thereafter, the portions in vicinities of the pair of bent end portions 70B of the spring 70 are mounted by being pushed into the space 68 between the inclined portion 66 and the distal end portions 62A of the leg portions 62 for mounting while the distal end portions 62A and the inclined portion 66 are resiliently deformed. (The gap dimension A of the space 68 is smaller than the wire diameter φ of the spring 70.)

As described above, in the state in which the spring 70 is resiliently engaged with the leg portions 62, 64 for mounting, substantially the entire periphery of the spring 70 is, in the axial direction (the left and right direction of FIG. 9), nipped between the distal end portions 62A, 64A of the leg portions 62, 64 for mounting and the reverse surface of the pad cover 52 (specifically, the bottom surface 53A of the bent portion 72), with the peripheral portions 70A of the spring 70 being resiliently deformed in the radial direction. In this way, the mark 50 does not come out in the direction of separating from the front surface side of the pad cover 52 (i.e., in the direction of arrow IN).

As can be understood from the above description, in the present second embodiment, the mark 50 can be easily mounted to the pad cover 52, merely by the spring 70, which is formed in a substantially annular shape, being made to engage the front surface sides (the sides facing the groove 53) of the leg portions 62, 64 for mounting.

Further, in accordance with the present second embodiment, each of the leg portions 62, 64 for mounting of the mark 50 are not heat-caulked or metal-caulked. Thus, the only assembly processes that are required are the following two processes: the process for inserting the mark 50 into the pad cover 52, and the process for mounting the spring 70 to the leg portions 62, 64 for mounting of the mark 50. Thus, the number of assembly processes can be reduced. Further, if these processes are carried out manually, there is no need for a process using special equipment. In addition, because the spring 70 is formed in a substantially annular shape, there is no need to provide a special space therefor at the reverse surface side of the pad cover 52. Accordingly, in accordance with the present second embodiment, the costs and space which is used can be reduced.

Moreover, in the present second embodiment, the gap dimension A of the space 68 between the pad cover 52 and the distal end portions 62A of the pair of leg portions 62 for mounting is set to be smaller than the wire diameter φ of the spring 70. Thus, at this portion, the spring 70 is mounted by being pushed into the space 68. Accordingly, after mounting the spring 70, the spring 70 does not inadvertently move outwardly in the radial direction, and does not come out from the leg portions 62, 64 for mounting. As a result, in accordance with the present second embodiment as well, in the same way as in the first embodiment, the mounted state of the mark 50 to the pad cover 52 is stable.

In addition, in the present second embodiment, the pair of wall portions 74 are formed to stand at substantial right angles from the pad cover 52, and are inserted between the pair of bent end portions 70B of the spring 70. Thus, relative movement (rotation) of the spring 70 in the peripheral direction can be prevented. Namely, rotation of the spring 70 can be prevented by the pair of wall portions 74. As a result, in accordance with the present second embodiment, shifting, in the peripheral direction, of the mounted position of the spring 70 can be prevented.

In the above-described second embodiment, the distal end portions 62A of only the pair of leg portions 62 for mounting are extended, and the gap dimension A of the space 68 is set to be smaller than the wire diameter φ of the spring 70. However, the present invention is not limited to the same, and dimensions can be set as described above for at least one of the leg portions for mounting.

In both of the first embodiment and the second embodiment, the substantially annular springs 32, 70 which are open at one peripheral direction portion thereof are used. However, the present invention is not limited to the same, and another resiliently deformable body may be used. For example, a spring, which is formed so as to be a continuous annular shape in the peripheral direction and is expandable and contractible in the radial direction (such as forming a small-diameter coil spring in a ring-shape) or the like may be used.

In the above first embodiment and second embodiment, the present invention is applied to the marks 14, 50. However, the present invention encompasses all objects which can be considered to be "plate bodies", even if they are not of the same type as the marks 14, 50 (e.g., the present invention encompasses even objects which are provided merely for the purpose of design or the like).

What is claimed is:

1. A structure for mounting to a steering wheel, the structure comprising:
    (a) a pad cover mountable to a steering wheel, the pad cover having a through hole defined therethrough;
    (b) a plate body having a leg inserted into the through hole;
    (c) a resiliently deformable body which is engaged with a distal end of the leg wherein said resiliently deformable body has a pair of opposing end portions, and
    (d) a stopper for receiving said opposing end portions of said deformable body to prevent said body from peripheral movement relative to said pad.

2. A structure for mounting to a steering wheel according to claim 1, wherein the distal end of the leg is bent and the resiliently deformable body engages with the distal end.

3. A structure for mounting to a steering wheel according to claim 2, wherein the resiliently deformable body is formed in an annular shape.

4. A structure for mounting to a steering wheel according to claim 3, wherein the resiliently deformable body engages with distal ends of a plurality of legs provided at the plate body.

5. A structure for mounting to a steering wheel according to claim 4, wherein a recess portion for accommodating the resiliently deformable body is formed at an opposing surface of the pad cover, and the recess portion includes an inclined surface for guiding the resiliently deformable body.

6. A structure for mounting to a steering wheel according to claim 5, wherein a distance between the inclined surface and the distal end of a leg is different from the distal end of at least one other leg and the inclined surface.

7. A structure for mounting to a steering wheel according to claim 4, wherein said stopper substantially prevents longitudinal directional movement of the resiliently deformable body.

8. A structure for mounting to a steering wheel according to claim 7, wherein the stopper includes projections extending from the plate body, and passing through the pad cover, with distal ends of the projections engaging with the opposing end portions of the resiliently deformable body.

9. A structure for mounting to a steering wheel according to claim 8, wherein the stopper has insertion portions which receive said end portions of the resiliently deformable body.

10. A structure for mounting to a steering wheel according to claim 9, wherein the end portions of the resiliently deformable body are bent, and are received in the insertion portions of the stopper.

11. A structure for mounting to a steering wheel according to claim 10, wherein the resiliently deformable body is resiliently deformed, when engaged to distal ends of the legs so that there is a tension force in a radial outward direction urging the resiliently deformable body to return to an undeformed state, and the distal ends of the legs each include a bend towards the radial outward direction, and the stopper suppresses spreading of the resiliently deformable body in the radial outward direction.

12. A structure for mounting to a steering wheel according to claim 11, wherein a guide for guiding an end portion of the resiliently deformable body is provided at the stopper.

13. A structure for mounting to a steering wheel according to claim 7, wherein the stopper includes walls formed on the pad cover.

14. A structure for mounting to a steering wheel according to claim 1, wherein a recess portion for accommodating the resiliently deformable body is formed at an opposing surface of the pad cover.

15. A structure for mounting to a steering wheel according to claim 1, wherein the resiliently deformable body is formed in an annular shape, and the distal e nd of the leg is bent in a radial outward direction relative to the resiliently deformable body, and the resiliently deformable body is engaged while resiliently deformed and exerts an urging force in a radial inward direction.

16. A structure for mounting to a steering wheel, the structure comprising:
    (a) a pad cover mountable to a steering wheel and having opposite sides and holes extending through one side to the other;
    (b) a plate body having a plurality of legs inserted through the holes and each leg having a distal end bent portion; and
    (c) an annular resiliently deformable body disposed at one side of the pad cover and engaging with the distal end bent portions of the plurality of legs inserted through the holes.

17. A structure for mounting to a steering wheel according to claim 16, wherein a stopper is formed to project from the plate body, and the resiliently deformable body includes an end portion which engages with the stopper.

18. A structure for mounting to a steering wheel according to claim 16, wherein the pad cover includes a stopper in the form of a wall on the pad cover, and the resiliently deformable body includes an end portion which engages with the stopper.

19. A structure for mounting to a steering wheel according to claim 18, wherein a recess portion, which accommodates the resiliently deformable body, is formed in one surface of the pad cover, and the recess portion includes an inclined surface which guides the resiliently deformable body, and distances between the inclined surface and distal end bent portions of at least some legs are different.

20. A structure for mounting to a steering wheel, the structure comprising:
    (a) a pad cover mountable to a steering wheel, the pad cover having through holes formed therethrough;
    (b) a plate body having a plurality of legs inserted into the through holes, and having a plurality of projections, each leg having a distal end bent portion;
    (c) an annular resiliently deformable body retaining the legs in the through holes, the resiliently deformable body engaging with distal end bent portions of the plurality of legs, the resiliently deformable body including end portions, which engage with the projections; and
    (d) a stopper which substantially prevents longitudinal movement of the resiliently deformable body.

21. A structure for mounting to a steering wheel according to claim 20, wherein the stopper is a projection from the plate body, the stopper including a distal end and passing through the pad cover, with the resiliently deformable body engaging on the distal end of the projection.

22. A structure for mounting to a steering wheel according to claim 20, wherein the stopper is a wall formed at a portion of the pad cover.

* * * * *